(12) United States Patent
Zhao et al.

(10) Patent No.: US 12,061,086 B2
(45) Date of Patent: Aug. 13, 2024

(54) SELF-ADAPTIVE HORIZONTAL ATTITUDE MEASUREMENT METHOD BASED ON MOTION STATE MONITORING

(71) Applicant: Harbin Engineering University, Harbin (CN)

(72) Inventors: Yuxin Zhao, Harbin (CN); Shuaiyang Li, Harbin (CN); Yueyang Ben, Harbin (CN); Lei Wu, Harbin (CN); Qian Li, Harbin (CN); Guangtao Zhou, Harbin (CN); Xinle Zang, Harbin (CN); Tingxiao Wei, Harbin (CN); Jiancheng Wang, Harbin (CN); Yifan Zhou, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 296 days.

(21) Appl. No.: 17/844,224

(22) Filed: Jun. 20, 2022

(65) Prior Publication Data
US 2022/0326017 A1    Oct. 13, 2022

Related U.S. Application Data

(63) Continuation of application No. PCT/CN2022/087805, filed on Apr. 20, 2022.

(30) Foreign Application Priority Data

Apr. 21, 2021    (CN) .......................... 202110428645.5

(51) Int. Cl.
*G01C 21/16*    (2006.01)
*G01C 21/18*    (2006.01)

(52) U.S. Cl.
CPC .......... *G01C 21/188* (2020.08); *G01C 21/18* (2013.01)

(58) Field of Classification Search
CPC .............................. G01C 21/188; G01C 21/18
See application file for complete search history.

(56) References Cited

U.S. PATENT DOCUMENTS

| 6,427,122 B1 * | 7/2002 | Lin ........................ G01S 19/44 701/472 |
| 2005/0006728 A1 | 1/2005 | Shizuno |

(Continued)

FOREIGN PATENT DOCUMENTS

| CN | 102096086 A | 6/2011 |
| CN | 108844536 A | 11/2018 |

(Continued)

*Primary Examiner* — Hussein Elchanti
(74) *Attorney, Agent, or Firm* — IPRO, PLLC

(57) ABSTRACT

Disclosed is a self-adaptive horizontal attitude measurement method based on motion state monitoring. Based on a newly established state space model, a horizontal attitude angle is taken as a state variable, an angular velocity increment $\Delta\omega^b$ for compensating a random constant zero offset is taken as a control input of a system equation, and a specific force $f^b$ for compensating the random constant zero offset is taken as a measurement quantity. Meanwhile, judgment conditions for a maneuvering state of a carrier are improved, and maneuvering information of the carrier is judged by comprehensively utilizing acceleration information and angular velocity information output by a micro electro mechanical system inertial measurement unit (MEMS-IMU), whereby a measurement noise matrix of a filter can be automatically adjusted, thereby effectively reducing the influence of carrier maneuvering on the calculation of a horizontal attitude. The method has no special requirement on the maneuvering state of the carrier, and can ensure that the system has high attitude measurement precision in different motion states without an external information assistance.

5 Claims, 3 Drawing Sheets

(56) References Cited

U.S. PATENT DOCUMENTS

| | | | | |
|---|---|---|---|---|
| 2011/0276305 | A1* | 11/2011 | Rinnan | G01C 21/183 |
| | | | | 702/141 |
| 2016/0349058 | A1* | 12/2016 | Yu | H01Q 3/02 |
| 2017/0108612 | A1* | 4/2017 | Aguib | G01V 7/16 |
| 2021/0137013 | A1* | 5/2021 | Müller | A01D 90/02 |
| 2022/0133212 | A1* | 5/2022 | Krueger | A61B 3/0041 |
| | | | | 600/301 |

FOREIGN PATENT DOCUMENTS

| | | |
|---|---|---|
| CN | 109163721 A | 1/2019 |
| CN | 110132271 A | 8/2019 |
| CN | 112629538 A | 4/2021 |
| CN | 113175926 A | 7/2021 |

* cited by examiner

SELF-ADAPTIVE HORIZONTAL ATTITUDE MEASUREMENT METHOD BASED ON MOTION STATE MONITORING

TECHNICAL FIELD

The disclosure relates to a self-adaptive horizontal attitude measurement method based on motion state monitoring, and belongs to the technical field of inertia.

BACKGROUND

With the development of micro electro mechanical system technology, a low-cost micro electro mechanical system inertial measurement unit (MEMS-IMU) is more frequently applied in the field of navigation. By measuring motion parameters by using inertial sensors based on a micro electro mechanical system, a complex motion state of a vessel in the sea can be detected, and users can acquire motion data of a surface vessel. The MEMS-IMU is required to accurately output angular motion parameters and linear motion parameters of a carrier in real time.

Micro electro mechanical gyroscopes have random drift characteristics, and integral errors thereof are accumulated over time, while accelerometers do not have accumulated errors but are susceptible to carrier vibration. Common algorithms for fusing data of the gyroscopes and the accelerometers are Kalman filtering and complementary filtering. For example, in the patent application No. 201811070907.X, entitled "Horizontal Attitude Self-Correction Method for MEMS Inertial Navigation System based on Maneuvering State Judgment", a carrier motion is divided into low, medium, and high dynamics by comparing an accelerometer output and a local gravity acceleration amplitude. In the low and medium dynamics, a measurement noise matrix is adjusted in real time. In the high dynamics, only time is updated. However, if the carrier is in the high dynamics for a long time, an attitude error will be increasing. For another example, in the patent application No. 202011092956.0, entitled "MARG Attitude Estimation Method for Small Unmanned Aerial Vehicle based on Self-Adaptive EKF Algorithm", an adaptive filtering algorithm for an external acceleration analyzes residual errors of three axes and then self-adaptively adjusts corresponding measurement noises, thereby avoiding losing useful acceleration information and improving the precision of attitude estimation. According to most of the traditional methods of self-adaptive adjustment, by comparing a modulus output by an accelerometer of a carrier with a local gravity acceleration, a maneuvering state of the carrier can be judged without considering the interference of an angular motion of the carrier on acceleration measurement. It may be insufficient for some complex environments.

SUMMARY

In view of the prior art, the technical problem to be solved by the disclosure is to provide a self-adaptive horizontal attitude measurement method based on motion state monitoring, which can improve the measurement precision of a horizontal attitude of a carrier in a maneuvering scene and provide accurate horizontal attitude information for the carrier.

In order to solve the above technical problem, a self-adaptive horizontal attitude measurement method based on motion state monitoring of the disclosure includes the following steps:

step 1: initially aligning a strapdown inertial navigation system, completing the calculation of a random constant zero offset of a device and the calculation of initial horizontal attitude angles, including a roll angle $\vartheta_0$ and a pitch angle $\phi_0$, and then entering a navigation working mode;

step 2: initializing a Kalman filter, and taking the initial horizontal attitude angles $\vartheta_0$ and $\phi_0$ obtained in step 1 as initial values of a Kalman filtering state quantity $X_0=[\vartheta_0 \ \phi_0]^T$, an initial mean square error being $P_0$;

step 3: sampling MEMS-IMU data at a $k^{th}$ time, and compensating a random constant zero offset thereof to obtain a compensated specific force $f_k^b$ and angular velocity $\omega_k^b$;

step 4: performing a Kalman filtering one-step prediction by using an angular velocity increment $\Delta\omega_k^b$ at the $k^{th}$ time as a known deterministic input $u_{k-1}$, where $\Delta\omega_k^b=\omega_k^b \cdot T$, T being a calculation period;

step 5: judging a maneuvering state of a carrier by using the specific force $f^b$ and the angular velocity $\omega^b$ from time k−N+1 to time k obtained in step 3, and self-adaptively adjusting a Kalman filtering measurement noise covariance matrix $R_k$, where N is the size of a data window;

step 6: when the specific force is $f_k^b=[f_{x,k} \ f_{y,k} \ f_{z,k}]^T$ at the $k^{th}$ time, selecting a measurement vector $Z_k=[f_{x,k} \ f_{y,k}]^T$ to perform measurement update so as to realize the correction of the state quantity, where $f_{x,k}$, $f_{y,k}$, and $f_{z,k}$ are components of the specific force $f_k^b$ n x-axis, y-axis, and z-axis directions of a carrier system respectively; and step 7: taking an estimated value of the state quantity at the $k^{th}$ time as an initial value of a state quantity at a next time, and repeatedly performing steps 3 to 6 until a navigation working state ends.

The method of the disclosure further includes the following operations:

1. The Kalman filtering one-step prediction in step 4 specifically is:

$$\begin{cases} \hat{X}_{k/k-1} = \Phi_{k/k-1}\hat{X}_{k-1} + B_{k-1}u_{k-1} \\ P_{k/k-1} = \Phi_{k/k-1}P_{k-1}\Phi_{k/k-1}^T + Q_{k-1} \end{cases}$$

where $\hat{X}_{k-1}$ is a state optimal estimation at a $k-1^{th}$ time, $P_{k-1}$ is a mean square error matrix of a state estimation at the $k-1^{th}$ time, $\hat{X}_{k/k-1}$ is a state one-step prediction at a $k^{th}$ time, $\Phi_{k/k-1}=I_2$ is a state one-step transition matrix at the $k^{th}$ time, $I_2$ is a second-order unit matrix, $$B_k = \begin{bmatrix} 0 & \cos\phi_{k-1} & -\sin\phi_{k-1} \\ 1 & \sin\phi_{k-1}\tan\vartheta_{k-1} & \cos\phi_{k-1}\tan\vartheta_{k-1} \end{bmatrix}$$

is an input coefficient matrix at the $k^{th}$ time, $\phi_{k-1}$ and $\vartheta_{k-1}$ are horizontal attitude optimal estimations at the $k-1^{th}$ time, $u_{k-1}$ is an angular velocity increment $\Delta\omega_k^b$ at the $k^{th}$ time, $P_{k/k-1}$ is a state one-step prediction mean square error matrix at the $k^{th}$ time, and $Q_k$ is a system noise variance matrix.

2. In step 5, the judging a maneuvering state of a carrier by using the specific force $f^b$ and the angular velocity $\omega^b$ obtained in step 3 specifically is: calculating the maneuvering state of the carrier by using the specific force $f^b$ and the angular velocity $\omega^b$ from time k−N+1 to time k obtained in step 3, and acquiring a maneuvering vector $T_k$ to realize maneuvering judgment, $T_k$ satisfying:

$$T_k = \left(\frac{1}{\sigma_f^2}\left\|f_k^b - g\frac{\overline{f}_k}{\|\overline{f}_k\|}\right\| + \frac{1}{\sigma_\omega^2}\|\overline{\omega}_k\|\right)$$

where $\overline{\omega}_k = \frac{1}{N}\sum_{i=k-N+1}^{k}\omega_i^b$ and $\overline{f}_k = \frac{1}{N}\sum_{i=k-N+1}^{k}f_i^b$ are mean values obtained by performing moving average on the specific force $f^b$ and the angular velocity $\omega^b$, which are output by an inertial measurement unit and used for compensating the random constant zero offset, from time k−N+1 to time k in step 3, respectively, the size of a data window being N, g being a local gravitational acceleration, and $\sigma_f$ and $\sigma_\omega$ being weighting coefficients respectively.

3. The self-adaptively adjusting a Kalman filtering measurement noise covariance matrix $R_k$ in step 5 specifically is:

$$R_k = \begin{bmatrix} \sigma_r^2 + T_{k,1} & 0 \\ 0 & \sigma_r^2 + T_{k,2} \end{bmatrix}$$

where $T_{k,i}$ is an $i^{th}$ element of $T_k$, and $\sigma_r^2$ is a variance corresponding to an accelerometer noise.

4. An update equation of the measurement update in step 6 is:

$$\begin{cases} K_k = P_{k/k-1}H_k^T(H_k P_{k/k-1}H_k^T + R_k)^{-1} \\ \hat{X}_k = \hat{X}_{k/k-1} + K_k(Z_k - H_k\hat{X}_{k/k-1}) \\ P_k = (I - K_k H_k)P_{k/k-1} \end{cases}$$

where $H_k = \begin{bmatrix} -g\cdot\cos\vartheta_k & 0 \\ -g\cdot\sin\phi_k\cos\vartheta_k & g\cdot\cos\phi_k\cos\vartheta_k \end{bmatrix}$ is a measurement matrix at time k, g is a local gravity acceleration, $\phi_k$ and $\vartheta_k$ are one-step prediction values of a horizontal attitude at time k, $K_k$ is a filtering gain at time k, $\hat{X}_k$ is a state estimation at time k, and $P_k$ is a state estimation mean square error matrix at time k.

The disclosure has the following beneficial effects. The disclosure relates to an attitude measurement unit using an MEMS-IMU as a core device. In the disclosure, a new state space model is established, a horizontal attitude angle is taken as a state variable, an angular velocity increment $\Delta\omega^b$ output by the MEMS-IMU is taken as a control input of a system equation, and a specific force $f^b$ output by the MEMS-IMU is taken as a measurement quantity. Meanwhile, maneuvering judgment conditions for a carrier are improved, and maneuvering information of the carrier is judged by comprehensively utilizing acceleration information and angular velocity information output by the MEMS-IMU, whereby a measurement noise matrix of a filter can be automatically adjusted, thereby effectively reducing the influence of carrier maneuvering on horizontal attitude information. The method has no special requirement on the maneuvering state of the carrier, can ensure that the system has high attitude measurement precision in different motion states without an external information assistance, and has a certain engineering application value.

DETAILED DESCRIPTION

Figure 1:
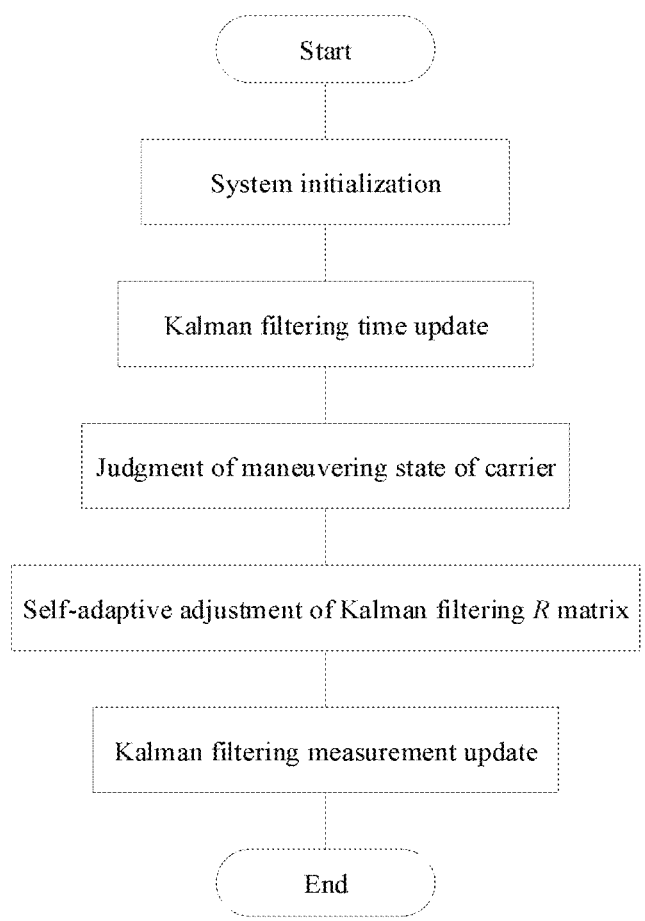
FIG. 1 is an implementation flowchart of the disclosure.

The disclosure will now be further described with reference to the accompanying drawings and specific embodiments.

The disclosure is implemented as follows:

An inertial measurement element of a strapdown inertial navigation system is fully pre-heated, and the calculation of a random constant zero offset of a device and the calculation of initial horizontal attitude angles are completed. Then a navigation working state may be entered. A horizontal attitude angle is taken as a state variable, an angular velocity increment $\Delta\omega^b$ output by an MEMS-IMU is taken as a control input of a system equation, and a specific force $f^b$ output by the MEMS-IMU is taken as a measurement quantity. A Kalman filtering equation is established, and maneuvering information of the carrier is judged by comprehensively utilizing acceleration information and angular velocity information output by the MEMS-IMU, whereby a measurement noise matrix of a filter can be automatically adjusted, thereby effectively reducing the influence of carrier maneuvering on the calculation of a horizontal attitude. The specific steps are as follows:

In step 1, an inertial measurement element of a strapdown inertial navigation system is fully pre-heated, the calculation of a random constant zero offset of a device and the calculation of initial horizontal attitude angles (a roll angle $\vartheta_0$ and a pitch angle $\phi_0$) are completed, and the element enters a navigation working state.

In step 2, the initial horizontal attitude angles $\vartheta_0$ and $\phi_0$ obtained in step 1 are taken as initial values of a Kalman filtering state quantity $X_0 = [\vartheta_0 \ \phi_0]^T$, an initial mean square error is $P_0$, and a Kalman filter is initialized.

In step 3, MEMS-IMU data is sampled at a $k^{th}$ time, and a random constant zero offset thereof is compensated to obtain a compensated specific force $f_k^b$ and angular velocity $\omega_k^b$.

In step 4, a Kalman filtering one-step prediction is performed by using an angular velocity increment $\Delta\omega_k^b$ at the $k^{th}$ time as a known deterministic input $u_{k-1}$, where $\Delta\omega_k^b = \omega_k^b \cdot T$, T being a calculation period.

In step 5, a maneuvering state of a carrier is judged by using the specific force $f^b$ and the angular velocity $\omega^b$ from time k−N+1 to time k obtained in step 2, and a Kalman filtering measurement noise covariance matrix $R_k$ is self-adaptively adjusted, where N is the size of a data window.

In step 6, the specific force $f_k^b$ at the $k^{th}$ time is used as a measurement vector $Z_k$ for measurement update so as to realize the correction of the state quantity.

In step 7, an estimated value of the state quantity at the $k^{th}$ time is taken as an initial value of a state quantity at a next time, and steps 3 to 6 are repeatedly performed until a navigation working state ends.

A correlated equation for Kalman filtering one-step prediction in step 4 is established:

$$\begin{cases} \hat{X}_{k/k-1} = \Phi_{k/k-1}\hat{X}_{k-1} + B_{k-1}u_{k-1} \\ P_{k/k-1} = \Phi_{k/k-1}P_{k-1}\Phi_{k/k-1}^T + Q_{k-1} \end{cases}$$

where $\hat{X}_{k-1}$ is a state optimal estimation at a k–1$^{th}$ time, $P_{k-1}$ is a mean square error matrix of a state estimation at the k–1$^{th}$ time, $\hat{X}_{k/k-1}$ is a state one-step prediction at a k$^{th}$ time, $\Phi_{k/k-1}=I_2$ is a state one-step transition matrix at the k$^{th}$ time, $I_2$ is a second-order unit matrix, $$B_k = \begin{bmatrix} 0 & \cos\phi_{k-1} & -\sin\phi_{k-1} \\ 1 & \sin\phi_{k-1}\tan\vartheta_{k-1} & \cos\phi_{k-1}\tan\vartheta_{k-1} \end{bmatrix}$$

is an input coefficient matrix at the k$^{th}$ time, $\phi_{k-1}$ and $\vartheta_{k-1}$ are horizontal attitude optimal estimations at the k–1$^{th}$ time, $u_{k-1}$ is an angular velocity increment $\Delta\omega_k^b$ at the k$^{th}$ time, $P_{k/k-1}$ is a state one-step prediction mean square error matrix at the k$^{th}$ time, and $Q_k$ is a system noise variance matrix.

In step 5, the maneuvering state of the carrier is judged, the maneuvering state of the carrier is calculated according to the specific force $f^b$ and the angular velocity $\omega^b$ obtained in step 3, and a maneuvering vector $T_k$ is acquired to realize maneuvering judgment:

$$T_k = \left(\frac{1}{\sigma_f^2}\left\|f_k^b - g\frac{\bar{f}_k}{\|\bar{f}_k\|}\right\| + \frac{1}{\sigma_\omega^2}\|\bar{\omega}_k\|\right)$$

where $\bar{\omega}_k = \frac{1}{N}\sum_{i=k-N+1}^{k}\omega_i^b$ and $\bar{f}_k = \frac{1}{N}\sum_{i=k-N+1}^{k}f_i^b$ are mean values obtained by performing moving average on the specific force $f^b$ and the angular velocity $\omega^b$ from time k–N+1 to time k in step 3, respectively, the size of a data window being N, g being a local gravitational acceleration, and $\sigma_f$ and $\sigma_\omega$ are weighting coefficients respectively.

A self-adaptive rule for the Kalman filtering measurement noise covariance matrix $R_k$ in step 5 is as follows:

$$R_k = \begin{bmatrix} \sigma_r^2 + T_{k,1} & 0 \\ 0 & \sigma_r^2 + T_{k,2} \end{bmatrix}$$

where $T_{k,i}$ is an i$^{th}$ element of $T_k$, and $\sigma_r^2$ is a variance corresponding to an accelerometer.

In step 6, measurement update is performed. The specific force $f_k^b=[f_{x,k}\ f_{y,k}\ f_{z,k}]^T$ at the k$^{th}$ time in step 3 is used as a measurement vector $Z_k=[f_{x,k}\ f_{y,k}]^T$ for measurement update. An update equation is as follows:

$$\begin{cases} K_k = P_{k/k-1}H_k^T(H_kP_{k/k-1}H_k^T + R_k)^{-1} \\ \hat{X}_k = \hat{X}_{k/k-1} + K_k(Z_k - H_k\hat{X}_{k/k-1}) \\ P_k = (I - K_kH_k)P_{k/k-1} \end{cases}$$

where $H_k = \begin{bmatrix} -g\cdot\cos\vartheta_k & 0 \\ -g\cdot\sin\phi_k\cos\vartheta_k & g\cdot\cos\phi_k\cos\vartheta_k \end{bmatrix}$ is a measurement matrix at time k, $\phi_k$ and $\vartheta_k$ are one-step prediction values of a horizontal attitude at time k, $K_k$ is a filtering gain at time k, $\hat{X}_k$ is a state estimation at time k, and $P_k$ is a state estimation mean square error matrix at time k.

Figure 2:
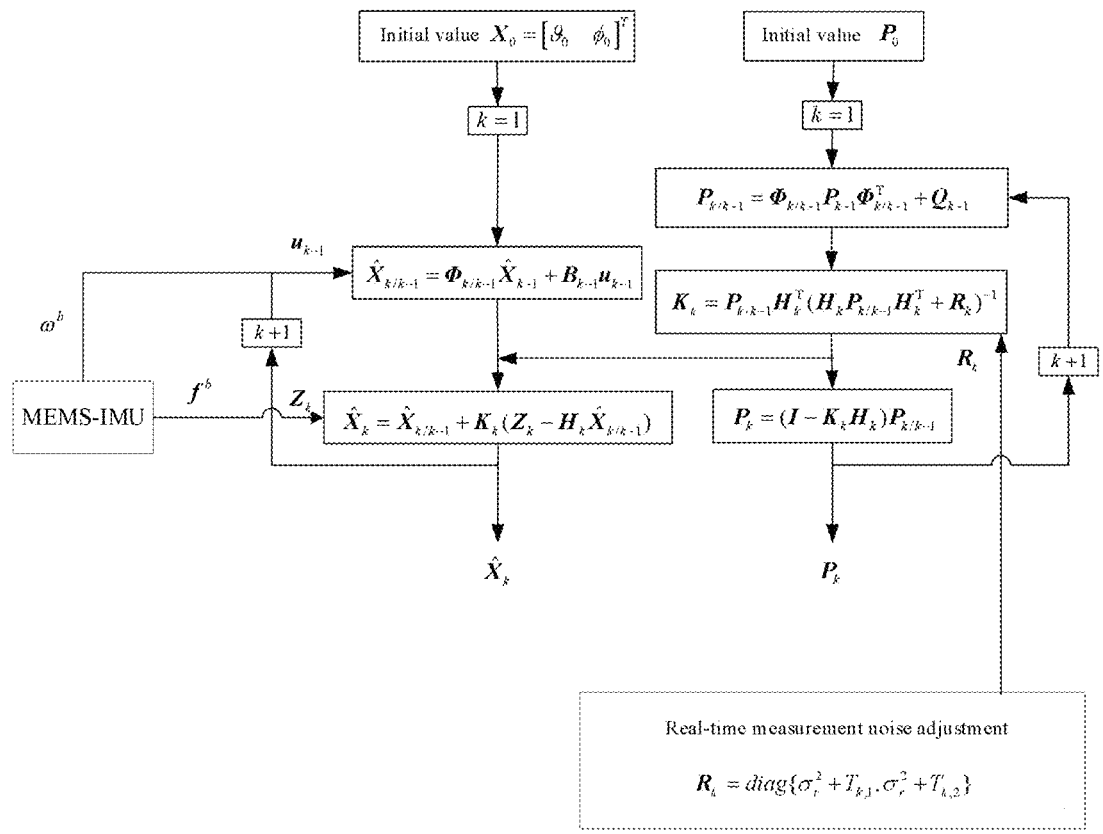
FIG. 2 is a flowchart of an implementation algorithm of the disclosure.

With reference to FIGS. 1 and 2, a specific embodiment of the disclosure includes the following steps:

In step 1, an inertial measurement element of a strapdown inertial navigation system is fully pre-heated.

In step 2, data of MEMS-IMU under a static state during a period of time is acquired, and it is considered that an average output value of an MEMS-IMU during the period of time is a random constant zero offset of a device, constant zero offset errors for a gyroscope and an accelerometer are corrected and compensated, and a specific force $f^b$ and an angular velocity $\omega^b$ after compensating the constant zero offset errors are obtained.

In step 3, the strapdown inertial navigation system is initially aligned to obtain initial horizontal attitude angles (a roll angle $\vartheta_0$ and a pitch angle $\phi_0$) of a carrier system (b system) relative to a navigation coordinate system (n system, the navigation coordinate system herein being a geographical coordinate system), and then a navigation working state starts to be entered.

In step 4, a Kalman filtering equation is established:

$$\begin{cases} X_k = \Phi_{k/k-1}X_{k-1} + B_{k-1}u_{k-1} + W_{k-1} \\ Z_k = H_kX_k + V_k \end{cases} \quad (1)$$

where $X_k$ is a state vector, $\Phi_{k/k-1}$ is a state one-step transition matrix, $B_{k-1}$ is an input coefficient matrix, $I_2$ is a second-order unit matrix, $u_{k-1}$ is a known deterministic input, $Z_k$ is a measurement vector, $H_k$ is a measurement matrix, $W_{k-1}$ is a system noise vector, and $V_k$ is a measurement noise vector.

In step 5, horizontal attitude angles are selected as a state quantity $X=[\vartheta\ \phi]^T$ (a roll angle $\vartheta$ and a pitch angle $\phi$), the initial horizontal attitude angles $\vartheta_0$ and $\phi_0$ obtained in step 3 are taken as initial values of the state quantity $X_0=[\vartheta_0\ \phi_0]^T$, an initial mean square error is $P_0$, and a Kalman filter is initialized.

In step 6, MEMS-IMU data is sampled at a k$^{th}$ time, and a random constant zero offset thereof is compensated to obtain a compensated specific force $f_k^b$ and angular velocity $\omega_k^b$.

In step 7, a Kalman filtering one-step prediction is performed by using an increment $\Delta\omega_k^b=\omega_k^b\cdot T$ (T being a calculation period) within a $\omega_k^b$ sampling interval at the k$^{th}$ time in step 6 as a known deterministic input $u_{k-1}$:

$$\begin{cases} \hat{X}_{k/k-1} = \Phi_{k/k-1}\hat{X}_{k-1} + B_{k-1}u_{k-1} \\ P_{k/k-1} = \Phi_{k/k-1}P_{k-1}\Phi_{k/k-1}^T + Q_{k-1} \end{cases} \quad (2)$$

where $\hat{X}_{k-1}$ is a state optimal estimation at a k–1$^{th}$ time, $P_{k-1}$ is a mean square error matrix of a state estimation at the k–1$^{th}$ time, $\hat{X}_{k/k-1}$ is a state one-step prediction at a k$^{th}$ time, $\Phi_{k/k-1}=I_2$ is a state one-step transition matrix at the k$^{th}$ time, $$B_k = \begin{bmatrix} 0 & \cos\phi_{k-1} & -\sin\phi_{k-1} \\ 1 & \sin\phi_{k-1}\tan\vartheta_{k-1} & \cos\phi_{k-1}\tan\vartheta_{k-1} \end{bmatrix}$$

is an input coefficient matrix at the k$^{th}$ time, $\phi_{k-1}$ and $\vartheta_{k-1}$ are horizontal attitude optimal estimations at the k–1$^{th}$ time, $u_{k-1}$ is an angular velocity increment $\Delta\omega_k^b$ at the k$^{th}$ time, $P_{k/k-1}$ is a state one-step prediction mean square error matrix at the k$^{th}$ time, and $Q_k$ is a system noise variance matrix.

In step 8, a maneuvering state of a carrier is judged by using the specific force $f^b$ and the angular velocity $\omega^b$ from time k–N+1 to time k obtained in step 6, and a maneuvering vector $T_k$ is acquired, thereby self-adaptively adjusting a Kalman filtering measurement noise covariance matrix $R_k$.

$$T_k = \left( \frac{1}{\sigma_f^2} \left\| f_k^b - g \frac{\bar{f}_k}{\|\bar{f}_k\|} \right\| + \frac{1}{\sigma_\omega^2} \|\bar{\omega}_k\| \right) \quad (3)$$

where $\bar{\omega}_k = \frac{1}{N} \sum_{i=k-N+1}^{k} \omega_i^b$ and $\bar{f}_k = \frac{1}{N} \sum_{i=k-N+1}^{k} f_i^b$ are mean values obtained by performing moving average on the specific force $f^b$ and the angular velocity $\omega^b$ from time k–N+1 to time k in step 6, respectively, the size of a data window is N, g is a local gravitational acceleration, $\sigma_f$ is a weighting coefficient of the specific force (usually 0.5-5 for vessels and 1-3 for vehicles), and $\sigma_\omega$ is a weighting coefficient of the angular velocity (usually 1-5 for vessels and 0.5-1 for vehicles).

A self-adaptive adjustment rule for the Kalman filtering measurement noise covariance matrix $R_k$ is as follows:

$$R_k = \begin{bmatrix} \sigma_r^2 + T_{k,1} & 0 \\ 0 & \sigma_r^2 + T_{k,2} \end{bmatrix} \quad (4)$$

where $T_{k,i}$ is an $i^{th}$ element of $T_k$, and $\sigma_r^2$ is a variance corresponding to an accelerometer.

In step 9, the specific force $f_k^b = [f_{x,k} \ f_{y,k} \ f_{z,k}]^T$ at the $k^{th}$ time in step 6 is used as a measurement vector $Z_k = [f_{x,k} \ f_{y,k}]^T$ for measurement update. An update equation is as follows:

$$\begin{cases} K_k = P_{k/k-1} H_k^T (H_k P_{k/k-1} H_k^T + R_k)^{-1} \\ \hat{X}_k = \hat{X}_{k/k-1} + K_k (Z_k - H_k \hat{X}_{k/k-1}) \\ P_k = (I - K_k H_k) P_{k/k-1} \end{cases} \quad (5)$$

where $H_k = \begin{bmatrix} -g \cdot \cos\vartheta_k & 0 \\ -g \cdot \sin\phi_k \cos\vartheta_k & g \cdot \cos\phi_k \cos\vartheta_k \end{bmatrix}$ is a measurement matrix at time k, g is a local gravity acceleration, $\phi_k$ and $\vartheta_k$ are one-step prediction values of a horizontal attitude at time k, $K_k$ is a filtering gain at time k, $\hat{X}_k$ is a state estimation at time k, and $P_k$ is a state estimation mean square error matrix at time k.

In step 10, an estimated value of the state quantity at the $k^{th}$ time is taken as an initial value of a state quantity at a next time, and steps 6 to 9 are repeatedly performed.

The self-adaptive horizontal attitude measurement method based on motion state monitoring has been completed so far.

Figure 3:
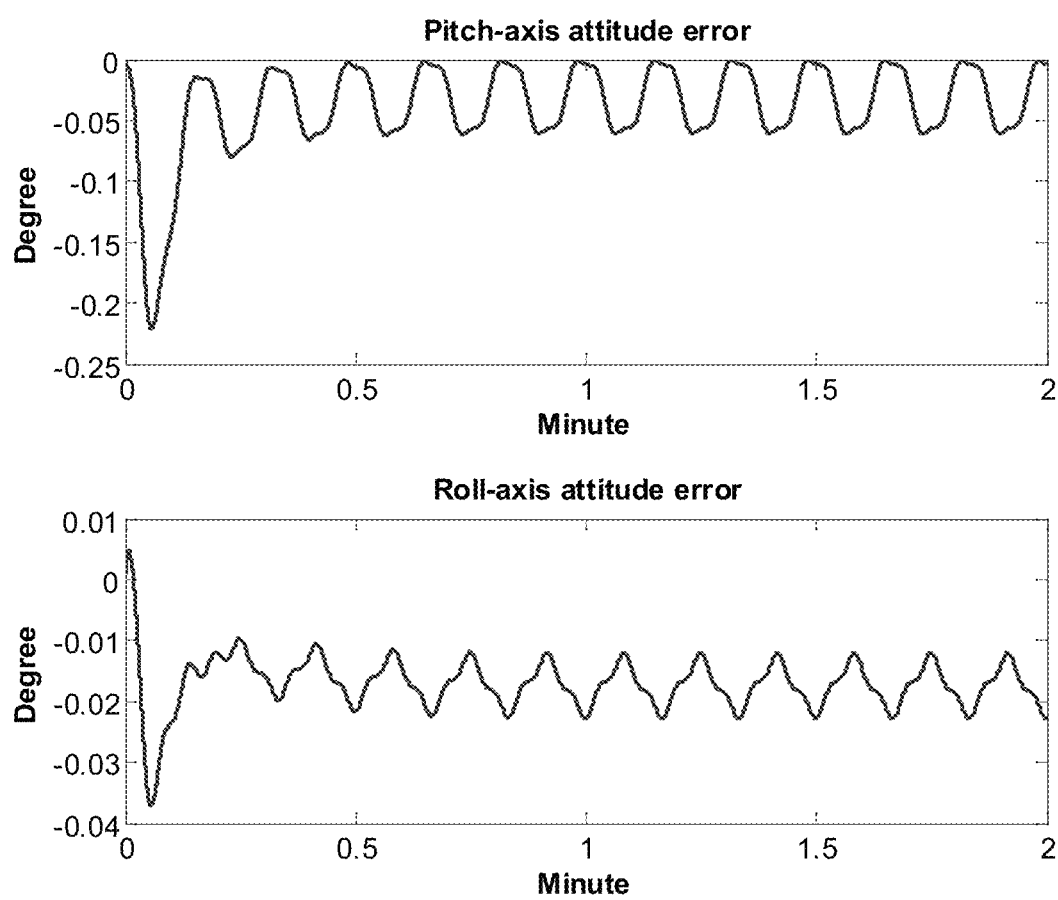
FIG. 3 is an algorithm calculation error according to the disclosure.

In order to illustrate the effectiveness of an algorithm, the algorithm is simulated. Simulation conditions are set as follows. A zero offset of a gyroscope of each axis is set to 1°/h, and a zero offset of an accelerometer is set to $1\times10^{-4}$ g. A motion state is set as follows. A carrier is in an oscillating motion state. The oscillation of each axis follows the sine function law. Oscillation amplitudes of rolling, pitching, and heading are all 10°, oscillation periods are all $10^S$, and initial attitude angles and phase angles are all 0°. The simulation results are shown in FIG. 3. The horizontal attitude measurement error is small, and the precision is high.

Although examples and drawings of the disclosure have been disclosed for illustrative purposes, those skilled in the art will appreciate that: various substitutions, changes and modifications are possible without departing from the spirit and scope of the disclosure and the appended claims, and therefore the scope of the disclosure is not limited to the disclosure of the examples and drawings.

What is claimed is:

1. A self-adaptive horizontal attitude measurement method based on motion state monitoring, comprising the following steps:
   step 1: initially aligning a strapdown inertial navigation system, completing the calculation of a random constant zero offset of a device and the calculation of initial horizontal attitude angles, comprising a roll angle $\vartheta_0$ and a pitch angle $\phi_0$, and then entering a navigation working mode;
   step 2: initializing a Kalman filter, and taking the initial horizontal attitude angles $\vartheta_0$ and $\phi_0$ obtained in step 1 as initial values of a Kalman filtering state quantity $X_0 = [\vartheta_0 \ \phi_0]^T$, an initial mean square error being $P_0$;
   step 3: sampling micro electro mechanical system inertial measurement unit (MEMS-IMU) data at a $k^{th}$ time, and compensating a random constant zero offset thereof to obtain a compensated specific force $f_k^b$ and angular velocity $\omega_k^b$;
   step 4: performing a Kalman filtering one-step prediction by using an angular velocity increment $\Delta\omega_k^b$ at the $k^{th}$ time as a known deterministic input $u_{k-1}$, wherein $\Delta\omega_k^b = \omega_k^b \cdot T$, T being a calculation period;
   step 5: judging a maneuvering state of a carrier by using the specific force $f^b$ and the angular velocity $\omega^b$ from time k–N+1 to time k obtained in step 3, and self-adaptively adjusting a Kalman filtering measurement noise covariance matrix $R_k$, wherein N is the size of a data window;
   step 6: when the specific force is $f_k^b = [f_{x,k} \ f_{y,k} \ f_{z,k}]^T$ at the $k^{th}$ time, selecting a measurement vector $Z_k = [f_{x,k} \ f_{y,k}]^T$ to perform measurement update so as to realize the correction of the state quantity, wherein $f_{x,k}, f_{y,k}$, and $f_{z,k}$ are components of the specific force $f_k^b$ in x-axis, y-axis, and z-axis directions of a carrier system respectively; and
   step 7: taking an estimated value of the state quantity at the $k^{th}$ time as an initial value of a state quantity at a next time, and repeatedly performing steps 3 to 6 until a navigation working state ends.

2. The self-adaptive horizontal attitude measurement method based on motion state monitoring according to claim 1, wherein the Kalman filtering one-step prediction in step 4 comprises:

$$\begin{cases} \hat{X}_{k/k-1} = \Phi_{k/k-1} \hat{X}_{k-1} + B_{k-1} u_{k-1} \\ P_{k/k-1} = \Phi_{k/k-1} P_{k-1} \Phi_{k/k-1}^T + Q_{k-1} \end{cases}$$

where $\hat{X}_{k-1}$ is a state optimal estimation at a $k-1^{th}$ time, $P_{k-}$ is a mean square error matrix of a state estimation at the $k-1^{th}$ time, $\hat{X}_{k/k-1}$ is a state one-step prediction at a $k^{th}$ time, $\Phi_{k/k-1} = I_2$ is a state one-step transition matrix at the $k^{th}$ time, $I_2$ is a second-order unit matrix, $$B_k = \begin{bmatrix} 0 & \cos\phi_{k-1} & -\sin\phi_{k-1} \\ 1 & \sin\phi_{k-1}\tan\vartheta_{k-1} & \cos\phi_{k-1}\tan\vartheta_{k-1} \end{bmatrix}$$

is an input coefficient matrix at the $k^{th}$ time, $\phi_{k-1}$ and $\vartheta_{k-1}$ are horizontal attitude optimal estimations at the $k-1^{th}$ time, $u_{k-1}$ is an angular velocity increment $\Delta\omega_k^b$ at the $k^{th}$ time, $P_{k/k-1}$ is a state one-step prediction mean square error matrix at the $k^{th}$ time, and $Q_k$ is a system noise variance matrix.

3. The self-adaptive horizontal attitude measurement method based on motion state monitoring according to claim 1, wherein in step 5, the judging a maneuvering state of a carrier by using the specific force $f^b$ and the angular velocity $\omega^b$ obtained in step 3 comprises: calculating the maneuvering state of the carrier by using the specific force $f^b$ and the angular velocity $\omega^b$ from time $k-N+1$ to time $k$ obtained in step 3, and acquiring a maneuvering vector $T_k$ to realize maneuvering judgment, $T_k$ satisfying:

$$T_k = \left(\frac{1}{\sigma_f^2}\left\|f_k^b - g\frac{\overline{f}_k}{\|\overline{f}_k\|}\right\| + \frac{1}{\sigma_\omega^2}\|\overline{\omega}_k\|\right)$$

where $\overline{\omega}_k = \frac{1}{N}\sum_{i=k-N+1}^{k}\omega_i^b$ and $\overline{f}_k = \frac{1}{N}\sum_{i=k-N+1}^{k}f_i^b$ are mean values obtained by performing moving average on the specific force $f^b$ and the angular velocity $\omega^b$ from time $k-N+1$ to time $k$ in step 3, respectively, the size of a data window being N, g being a local gravitational acceleration, and $\sigma_f$ and $\sigma_\omega$ being weighting coefficients respectively.

4. The self-adaptive horizontal attitude measurement method based on motion state monitoring according to claim 3, wherein the self-adaptively adjusting a Kalman filtering measurement noise covariance matrix $R_k$ in step 5 comprises:

$$R_k = \begin{bmatrix} \sigma_r^2 + T_{k,1} & 0 \\ 0 & \sigma_r^2 + T_{k,2} \end{bmatrix}$$

where $T_{k,i}$ is an $i^{th}$ element of $T_k$, and $\sigma_r^2$ is a variance corresponding to an accelerometer noise.

5. The self-adaptive horizontal attitude measurement method based on motion state monitoring according to claim 1, wherein an update equation of the measurement update in step 6 is:

$$\begin{cases} K_k = P_{k/k-1}H_k^T(H_k P_{k/k-1}H_k^T + R_k)^{-1} \\ \hat{X}_k = \hat{X}_{k/k-1} + K_k(Z_k - H_k\hat{X}_{k/k-1}) \\ P_k = (I - K_k H_k)P_{k/k-1} \end{cases}$$

where $H_k = \begin{bmatrix} -g\cdot\cos\vartheta_k & 0 \\ -g\cdot\sin\phi_k\cos\vartheta_k & g\cdot\cos\phi_k\cos\vartheta_k \end{bmatrix}$ is a measurement matrix at time k, g is a local gravity acceleration, $\phi_k$ and $\vartheta_k$ are one-step prediction values of a horizontal attitude at time k, $K_k$ is a filtering gain at time k, $\hat{X}_k$ is a state estimation at time k, and $P_k$ is a state estimation mean square error matrix at time k.

* * * * *